(12) United States Patent
Sato

(10) Patent No.: US 7,251,394 B2
(45) Date of Patent: Jul. 31, 2007

(54) OPTICAL ISOLATOR WITH TILTED OPTICAL ISOLATOR ELEMENT

(75) Inventor: Yasushi Sato, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/169,229

(22) Filed: Jun. 27, 2005

(65) Prior Publication Data

US 2007/0014516 A1 Jan. 18, 2007

(30) Foreign Application Priority Data

Jun. 29, 2004 (JP) ............ P 2004-191744
Nov. 29, 2004 (JP) ............ P 2004-344830

(51) Int. Cl.
G02B 6/26 (2006.01)

(52) U.S. Cl. ............ 385/31; 385/15; 385/33; 385/50

(58) Field of Classification Search ......... 385/11, 385/15, 24, 27, 31
See application file for complete search history.

(56) References Cited

U.S. PATENT DOCUMENTS 5,848,203 A  12/1998  Kawakami et al. .... 359/341.33
6,317,253 B1  11/2001  Miyazaki et al. ............ 385/11
6,901,087 B1 *  5/2005  Richardson et al. .......... 372/20

FOREIGN PATENT DOCUMENTS

| JP | 05-136490 | | 6/1993 |
| JP | 08-194130 | | 7/1996 |
| JP | 08-286150 | | 11/1996 |
| JP | 09-054283 | | 2/1997 |
| JP | 2001-044553 | * | 1/2002 |
| JP | 2002014253 | * | 1/2002 |
| JP | 2002-228843 | | 8/2002 |
| JP | 2002258116 | * | 9/2002 |
| JP | 2004117913 | * | 4/2004 |

* cited by examiner

Primary Examiner—Brian Healy
Assistant Examiner—Charlie Peng
(74) Attorney, Agent, or Firm—Hogan & Hartson LLP (57) ABSTRACT

An optical isolator including: (a) a support body; (b) an optical fiber assembly disposed in the support body including a first single mode fiber, a first graded index fiber, a coreless fiber, a second graded index fiber, and a second single mode fiber; and (c) an optical isolator element disposed in a groove formed in the support body so as to separate the coreless fiber. The optical isolator element is tilted with respect to the optical axis of the optical fiber assembly, thereby to achieve optical coupling with both the end face of the first graded index fiber on the coreless fiber side and the end face of said the graded index fiber on the coreless fiber side.

4 Claims, 6 Drawing Sheets

OPTICAL ISOLATOR WITH TILTED OPTICAL ISOLATOR ELEMENT

BACKGROUND OF THE INVENTION

1. Field of the Invention

The present invention relates to an optical isolator that utilizes nonreciprocity and, more particularly, to a polarization independent optical isolator particularly suitable for optical communications.

2. Description of the Related Art

An optical isolator has directivity in its function so as to allow forward propagation of light but blocks backward propagation of light. A laser diode (hereinafter abbreviated as LD) used in optical communications or optical measurements, when reflected light returning from the outside enters an active layer of the LD, experiences the collapse of internal interference leading to such troubles as wavelength deviation and fluctuation in the output power. In order to prevent the reflected light from returning so that the LD maintains stable oscillation, an optical isolator that prevents light from propagating backward is used. The optical isolator is indispensable in such applications as high-precision measurements, communications with high-speed modulation and high-density communications that require strict control of the wavelength.

Figure 2A:
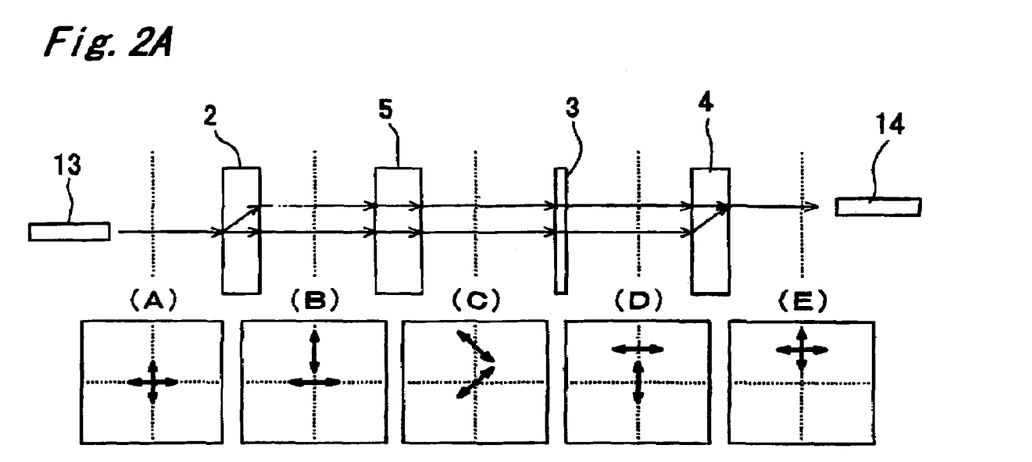
FIGS. 2A and 2B are drawings explanatory of the constitution and operation of optical isolator element.
Figure 2B:
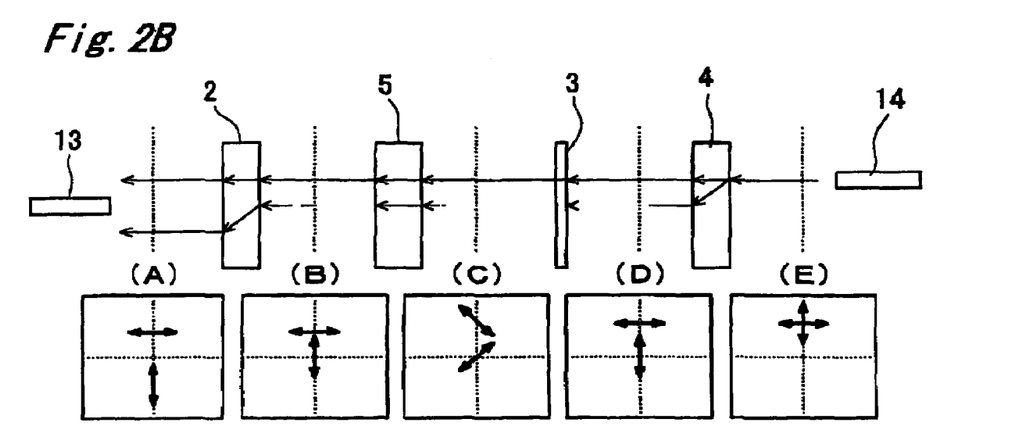

FIGS. 2A and 2B show the constitution and operation of a polarization independent optical isolator. The optical isolator comprises an input optical fiber 13, a first birefringent crystal 2, a Faraday rotator 5, a second birefringent crystal 3, a third birefringent crystal 4 and an output optical fiber 14. Although there are lenses provided between the input optical fiber 13 and the first birefringent crystal 2, and between the third birefringent crystal 4 and the output optical fiber 14 in an actual setup, they are omitted here for simplicity.

Drawings (A) through (E) of FIG. 2A and FIG. 2B show the positions of light rays and the directions of polarization at positions of (A) through (E). Drawings (A) through (E) of FIG. 2A and FIG. 2B show the states viewed from the left-hand side of the drawing, where the center of an arrow indicates the position of the light ray and the orientation of the arrow indicates the direction of polarization.

FIG. 2A shows the operation for forward propagation. Light ray emerging from the input optical fiber 13 is in a state of mixed polarization at position (A). This light ray is split into ordinary light ray and extraordinary light ray when passing through the first birefringent crystal 2, with the extraordinary light ray being shifted by birefringence. Consequently, there are two light rays that have been split at position (B). Then the direction of polarization is rotated by 45 degrees when passing through the Faraday rotator 5, thus assuming the state shown in (C). Direction of polarization is further rotated by 45 degrees when passing through the second birefringent crystal 3, thus assuming the state shown in (D). Then, when passing through the third birefringent crystal 4, the light rays are synthesized by birefringence, thus assuming the state shown in (E). The synthesized light ray propagates toward the output optical fiber 14.

FIG. 2B shows the operation for backward propagation. Light ray emerging from the output optical fiber 14 is in a state of mixed polarization at position (E). This light ray is split by birefringence into two light rays when passing through the third birefringent crystal 4 as shown in (D). Then the polarization plane is rotated by 45 degrees when passing through the second birefringent crystal 3. Since this rotation is a reciprocal rotation that is dependent on the direction of light propagation, the polarization plane is rotated in a direction opposite to that of the case of forward propagation shown in FIG. 2A, thus assuming the state shown in (C). Then the polarization plane is rotated by 45 degrees when passing through the Faraday rotator 5. Since this rotation is a nonreciprocal rotation that is independent of the direction of light propagation, the polarization plane is rotated in the same direction as in the case of forward propagation shown in FIG. 2A, thus assuming the state shown in (B). The state of (B) is reverse to the state of forward propagation. As a result, separation of the ordinary light ray and the extraordinary light ray becomes greater when passing through the first birefringent crystal 2, thus assuming the state shown in (A). As a consequence, there is generated a deviation in position from the input optical fiber 13, thus resulting in a reverse propagation loss.

The polarization independent optical isolator that uses the birefringent crystal functions through the use of shifting light ray as described above, and therefore the input optical fiber 13 and the output optical fiber 14 are staggered with respect to each other in the constitution described above.

Japanese Unexamined Patent Publication (Kokai) No. 8-194130 discloses an example where a compact optical isolator is constituted by using a thermal expansion core fiber instead of lens. In this example, an optical isolator element is tilted so as to correct the shifting of beam to prevent misalignment from occurring between the thermal expansion core fibers on the input and output sides.

Japanese Unexamined Patent Publication (Kokai) No. 9-54283 discloses an optical isolator that similarly uses a thermal expansion core fiber. In this example, too, in order to prevent misalignment from occurring between the thermal expansion core fibers on the input and output sides, wedge-shaped polarizing beam splitter is used in addition to tilting the optical isolator element.

Japanese Unexamined Patent Publication (Kokai) No. 8-286150 discloses an example where a rod lens is used instead of the thermal expansion core fiber. This document describes a constitution where the end face of the rod lens is tilted in order to prevent back reflection.

SUMMARY OF THE INVENTION

An object of the present invention is to provide an optical isolator that is capable of correcting the shifting of light beam due to the optical isolator element and can be easily assembled and adjusted.

The optical isolator of the present invention comprises:

(a) a support body;

(b) an optical fiber assembly disposed in the support body including a first single mode fiber, a first graded index fiber that is connected to said first single mode fiber and has refractive index which gradually decreases from the center axis toward the outer surface, a coreless fiber that is connected to said first graded index fiber and does not have a core, a second graded index fiber that is connected to said coreless fiber, and a second single mode fiber connected to said second graded index fiber; and (c) an optical isolator element disposed in a groove formed in said support body so as to separate said coreless fiber, wherein said optical isolator element is tilted with respect to the optical axis of said optical fiber assembly, thereby to achieve optical coupling with both the end face of said first graded index fiber on the coreless fiber side and the end face of said second graded index fiber on the coreless fiber side.

According to the present invention, beam shift within the optical isolator element can be effectively corrected by tilting the optical isolator element with respect to the optical axis, so as to achieve optical coupling with both the end face of the first graded index fiber on the coreless fiber side and the end face of the second graded index fiber on the coreless fiber side. The present invention also provides the optical isolator that is small in size and is easy to assemble, without causing misalignment between the optical fibers on the input and output sides.

A polarization independent optical isolator can be made by constituting the optical isolator element from a plurality of birefringent substrates.

The groove may be inclined, by the same angle as the optical isolator element is tilted, with respect to the optical axis of the optical fiber assembly. This makes it easier to adjust the tilting angle of the optical isolator element when assembling the optical isolator.

It is preferable to fill the groove with a light transmitting filler. It is particularly preferable that the refractive index of the light transmitting filler is from 0.94 to 1.06 times as large as the refractive index of the coreless fiber. With this configuration, since there is almost no difference in the refractive index between the coreless fiber and the light transmitting filler at the interface thereof, sufficient level of reflection attenuation can be ensured regardless of the tilting angle of the end face of the coreless fiber (that is, even when the end face is not tilted). Also because the light ray hardly refracts even when the end face of the coreless fiber is tilted, there is less effect of the variation in the tilting angle of the end face of the coreless fiber on the insertion loss, and allowance margin for adjusting the tilting angle of the optical isolator element increases. As a result, an optical isolator having smaller insertion loss can be easily manufactured.

It is preferable that the optical fiber assembly is made of quartz, and has such a constitution as the inclination angle X of the groove with respect to the optical axis of the optical fiber assembly and the tilting angle Y of the optical isolator element with respect to the optical axis of the optical fiber assembly are within an area delimited by straight lines represented by equations (1) through (4), with X plotted along x axis and Y plotted along y axis.

$$Y=-0.108X+5.528 \quad (1)$$

$$Y=0.093X+4.633 \quad (2)$$

$$Y=0.092X+3.791 \quad (3)$$

$$Y=-0.109X+4.522 \quad (4)$$

This enables it to provide the optical isolator having low insertion loss.

DESCRIPTION OF THE PREFERRED EMBODIMENTS

Figure 1:
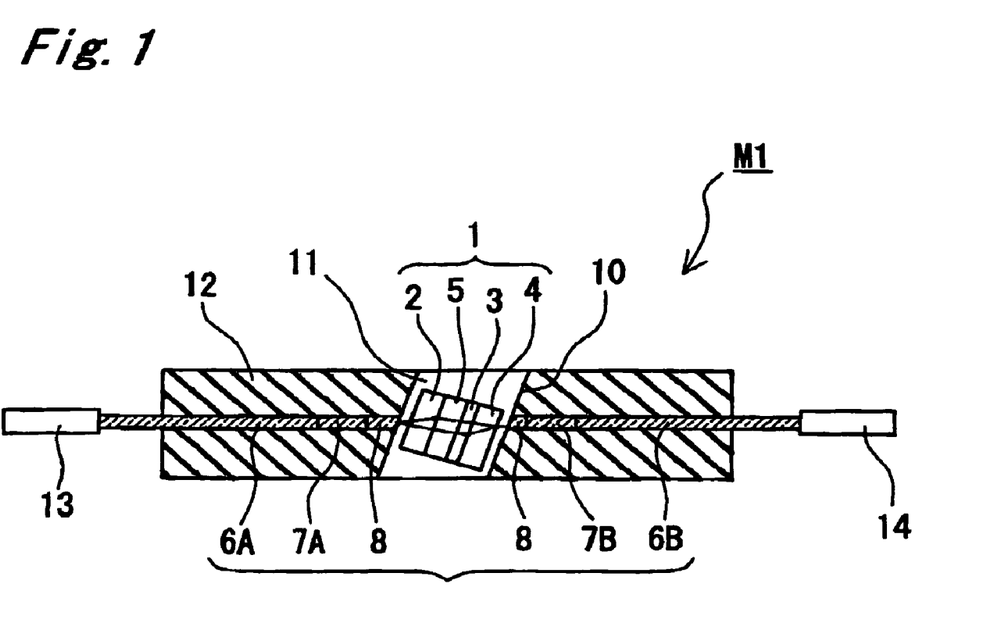
FIG. 1 is a schematic diagram showing one embodiment of the present invention.

An optical isolator M1 comprises a support body 12, an optical fiber assembly 9 disposed in the support body 12 and an optical isolator element 1 disposed in a groove 10 formed in the support body, as shown in FIG. 1.

The optical fiber assembly 9 is formed by connecting a first single mode fiber 6A, a first graded index fiber 7A, a coreless fiber 8, a second graded index fiber 7B and a Second single mode fiber 6B successively in this order. The optical isolator M1 has a so-called pigtail shape, with portions of the single mode fibers 6A and 6B protruding beyond the support body 12 by a predetermined length.

The support body 12 may be constituted from a zirconia plate that has a groove measuring, for example, 2 mm in width and 12 mm in length formed therein running in the longitudinal direction. The optical fiber assembly 9 is secured in the support body 12. A groove 10 having width of, for example, about 1.8 mm is also formed in the support body 12 so as to cross the coreless fiber 8 of the optical fiber assembly 9 that is inserted into the support body 12. The groove 10 is formed in the support body 12 so as to cut through the coreless fiber 8 at substantially the center thereof. The groove 10 is inclined with respect to the optical axis. When the careless fiber 8 is cut obliquely in this way, changes in the optical characteristics do not occur unlike in a case where a lens is configured obliquely. The graded index fibers 7A, 7B are hardly affected by the refraction caused by oblique cutting. When a groove is formed in the coreless fiber that is integrated with the optical fiber, inclined faces of the careless fiber on the input and output sides can be automatically made substantially parallel to each other. Moreover, it becomes unnecessary to adjust the positions of the optical fibers after arranging an optical component 1 to be described below.

Disposed in the groove 10 is the optical isolator element 1, so that optical coupling is established via the optical isolator element 1. The optical isolator element 1 is formed by integrating a first birefringent crystal 2, a Faraday rotator 5, a second birefringent crystal 3 and a third birefringent crystal 4. The light transmitting filler 11 is provided between the first birefringent crystal 2 and the end face of the coreless fiber 8, and between the third birefringent crystal 4 and the end face of the coreless fiber 8. Refractive index of the light transmitting filler 11 is preferably matched to that of the coreless fiber 8. Magnetic field applying means is omitted in the drawing. It is preferable to form an anti-reflection film on tho surface of the optical isolator 1 so as to restrict the back to the light transmitting filler 11 within, for example, 0.2%.

The optical isolator element 1 is tilted with respect to the optical axis so as to achieve optical coupling with both the end face of the first graded index fiber 7A on the coreless fiber 8 side and the end face of the second graded index fiber 7B on the coreless fiber 8 side. Optical coupling is defined here as a state of the centers of the graded index fibers 7A, 7B being aligned with the optical axis, assuming that the light beam is smaller in diameter than the cross section of the cores of the graded index fibers 7A, 7B. In other words, optical coupling means that the beam diameter of a light ray exited from the single mode fiber 6A is enlarged while passing the first graded index fiber 7A; the light exited from the center of the first graded index fiber 7A passes the optical isolator element via the coreless fiber 8; the light enters the second graded index fiber 7B via the coreless fiber 8; the beam diameter of the light is reduced to the mode field diameter of the second single mode fiber 6B; and the light enters the core of the second single mode fiber 6B. It is preferable to satisfy the following three conditions:

1) the center of the light beam is substantially aligned with the core center of the second graded index fiber 7B; and 2) beam diameter is smaller than the diameter of the core of the second graded index fiber 7B.

3) beam diameter is reduced while passing the second graded index fiber 7B to the mode field diameter of the second single mode fiber 6B, and the shrunk light enters the center of the core of the second single mode fiber 6B.

Inclination angle of the groove 10 with respect to the optical axis is preferably the same as the tilting angle of the optical isolator element 1 with respect to the optical axis. This is because it enables it to install the optical isolator element 1 along the groove 10 without need for any special tools and adjustment. Due to the presence of the light transmitting filler 11, there occurs no substantial refraction at the interface between the coreless fiber 8 and the light transmitting filler 11. Therefore, the relationship between the angle of disposing the optical isolator element 1 and the angle of forming the groove 10 can be set relatively freely. Accordingly, the process of assembling the optical isolator can be made easier when the two angles are made identical.

Length of the coreless fiber 8 (length before forming the groove 10) is preferably adjusted so that the beam spots formed by the two graded index fibers 7A, 7B coincident with each other, namely focused, at the center. The optical fiber assembly 9 may be formed, for example, by connecting such members as follows in series: (a) the first single mode fiber 6A having mode field diameter (MFD) of, for example, about 10 µm. (b) the first graded index fiber 7A having pitch (P) of 0.25 or more, (c) the coreless fiber 0 having a length of 2d, d being the distance between the beam waist of light emerging from the graded index fiber 7A and the exiting end face of the graded index fiber 7A, (d) the second graded index fiber 7B having the same length as the first graded index fiber 7A, and (e) the second single mode fiber 6B.

Condition for collimation is specified as P=0.25 in case there is a point light source on the end face of the graded index fiber. Highest efficiency of coupling, however, is obtained when the beam waists coincident with each other, namely focused, at the center of the two graded index fibers 7A, 7B. When P=0.25, the beam waists rest just at the emerging end face of the graded index fibers 7A, 7B. In this case, the beam waists do not coincident with each other when an optical isolator element is interposed between the graded index fibers 7A, 7B. Therefore, in order to form the beam waist at a position located away from the emerging end face of the graded index fiber, the condition of P>0.25 should be satisfied.

Light entering the single mode fiber 6A is spread by the first graded index fiber 7A so as to have a larger beam diameter, turns into a beam that has a waist at the center of the coreless fiber 8, passes the optical isolator element 1, passes the coreless fiber 8 again, and is converged by the graded index fiber 7B to have beam diameter of 10 µm before proceeding to the second single mode fiber 6B.

In this embodiment, the portion corresponding to a lens system becomes substantially alignment-free, despite such a constitution that the optical element 1 is inserted into the transmission path. While the graded index fibers are used, their focal lengths are already adjusted by the length of the coreless fiber 8. Consequently, proper focusing of the graded index fibers 7A, 7B is guaranteed at the time of assembling the optical fiber assembly 9, so that no adjustment is required after mounting the optical element 1. This constitution simplifies the manufacturing process. There is also such an advantage that unsatisfactory coupling, if any, can be found in the early stage of the process, namely before securing the optical component. As a result, total efficiency of the process can be improved while significantly reducing the damage caused by defects.

Refractive index of the light transmitting filler 11 is preferably in a range from 0.94 to 1.06 times as large as the refractive index of the coreless fiber 8. When this is the case, since there is no substantial difference in the refractive index, Fresnel reflection hardly occurs even if the end face angle of the coreless fiber 8 is zero, thus making it possible to achieve a reflection attenuation of 30 dB or more. Furthermore, higher reflection attenuation can be achieved easily by forming the inclined end face of the coreless fiber 8. In case the light transmitting filler is not provided and the gap between the coreless fiber 8 and the optical isolator element 1 is filled with air (of which refractive index is 1), in contrast, reflection attenuation reaches 15 dB unless the interface between the coreless fiber 8 and air is formed obliquely, thus making it useless as an isolator.

Figure 4A:
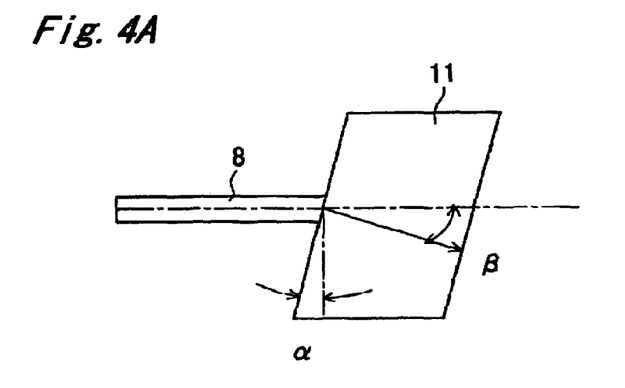
FIG. 4A is a schematic diagram explanatory of the end face angle of coreless fiber and the angle of emerging light ray.
Figure 4B:
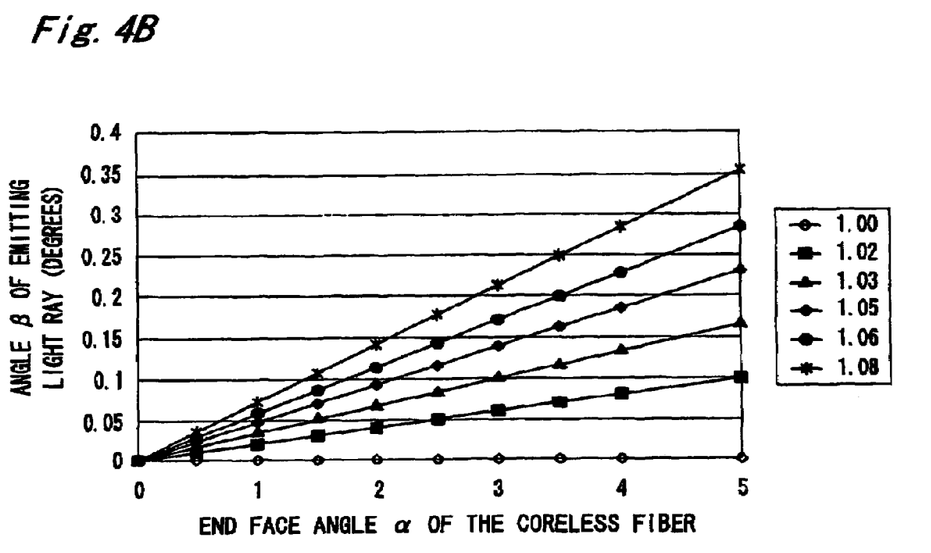
FIG. 4B is a graph showing the relationship between the end face angle of the coreless fiber and the angle of emerging light ray for various values of relative refractive index.

Also due to the presence of the light transmitting filler 11, there occurs no significant refraction at the end face of the coreless fiber 8, even when the end face of the coreless fiber 8 is inclined. Assume that the end face of the coreless fiber 8 is inclined at an angle $\alpha$ from a plane perpendicular to the optical axis and the beam emerging from the end face of the coreless fiber 8 is inclined at an angle $\beta$ from the optical axis, as shown in FIG. 4A. FIG. 4B shows the relation between the end face angle $\alpha$ of the coreless fiber 8 and the refraction angle $\beta$ of the emerging light beam for various values of relative refractive index of the light transmitting filler 11 relative to the coreless fiber 8. In FIG. 4B, end face angle $\alpha$ of the coreless fiber 8 is the horizontal axis and the refraction angle $\beta$ of the emerging light beam is the vertical axis. Straight lines in FIG. 4B represent the characteristics obtained with the values of relative refractive index shown on the right box in the drawing. As can be seen from FIG. 4B, almost no refraction occurs when the relative refractive index is from 1.00 to 1.06. For example, in case the coreless fiber 8 is made of near-pure quartz having refractive index of 1.45 and the light transmitting filler 11 has refractive index of 1.48 (relative refractive index 1.02), the emerging light beam undergoes refraction of only 0.02 degrees even when the end face of the coreless fiber is passed only once. In a conventional optical system, light refracts at the emerging end face of a fiber or the like and therefore the optical component must be tilted in accordance to the refraction angle. When the light transmitting filler 11 having relative refractive index as described above is used, however, the end face angle of the coreless fiber 8 has almost no influence on the angle of installing the optical isolator element 1. As a result, the end face angle of the coreless fiber 8 may be set to an optimum value that takes the reflection attenuation into account. Also some deviations, if any, in the manufacturing steps and in alignments, will not cause accumulating errors, and therefore the product can be manufactured reliably.

Figure 5A:
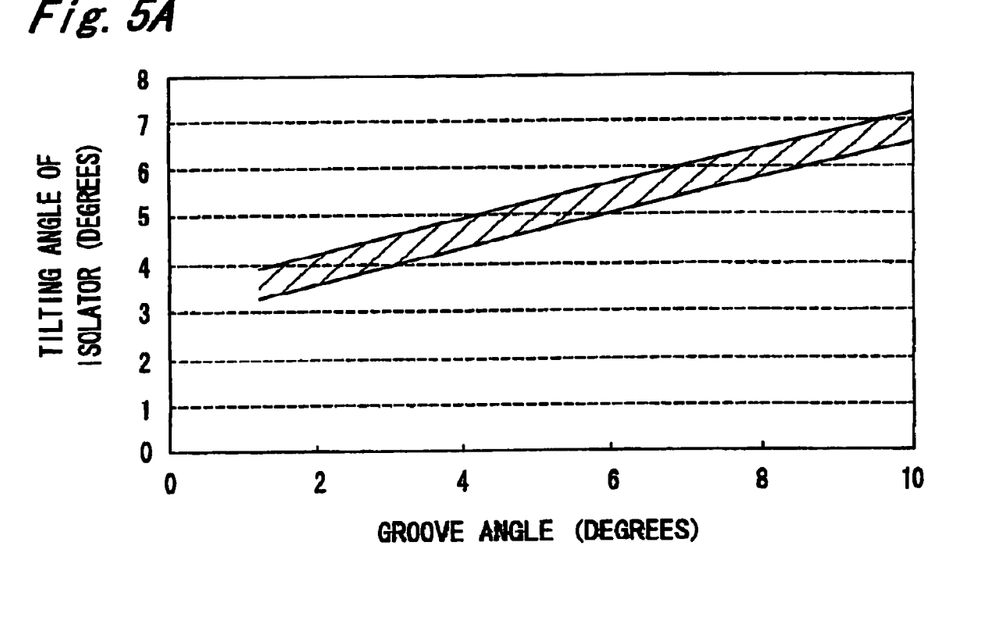
FIGS. 5A and 5B are graphs showing the relationship between the groove angle and the tilting angle of the optical isolator element that restrict the misalignment of beams within 5 μm, FIG. 5A showing a case where gap is filled with air without using a light transmitting filler, and FIG. 5B showing a case where light transmitting filler is used.
Figure 5B:
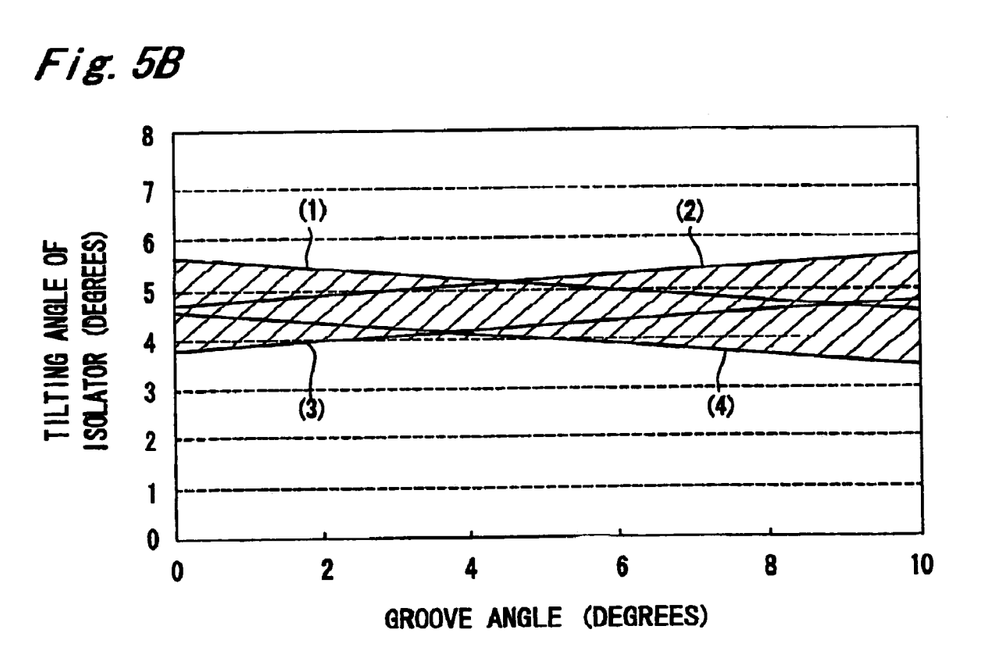

In case the optical fiber assembly made of a material based on quartz (refractive index of 1.45) is used, refractive index from 1.363 to 1.537 of the light transmitting filler means relative refractive index from 0.94 to 1.06. Displacement between the input light beam entering the optical isolator element having this constitution and the output light beam therefrom was studied. It was found that restricting the increase in insertion loss within 0.3 dB for a light beam about 40 μm in diameter requires it to keep the displacement between the input and output beams within 5 μm. It was also found that this range corresponds to the shaded area delimited by the lines represented by equations (1) through (4) in FIG. 5B. In FIG. 5B, angle of the groove 10 (that is equal to the end face angle of the coreless fiber 8) is plotted along the horizontal axis and the tilting angle of the optical isolator element 1 is plotted along the vertical axis. Insertion loss of the optical isolator element 1 can be kept within 0.3 dB when the angles are kept within the shaded area of FIG. 5B.

$$Y=-0.108X+5.528 \quad (1)$$

$$Y=0.093X+4.633 \quad (2)$$

$$Y=0.092X+3.791 \quad (3)$$

$$Y=-0.109X+4.522 \quad (4)$$

In case the light transmitting filler 11 is not provided and the gap is filled with air (refractive index 1), in contrast, displacement between the light beams can be corrected by tilting the optical isolator element 1 at a proper angle, even when the interface between air and the coreless fiber 8 is formed obliquely, namely the groove is inclined. In this case, too, it is necessary to keep the displacement between the beams within 5 μm in order to restrict the loss due to beam displacement within 0.3 dB for light beam about 20 μm in radius. However, in case the light transmitting filler 11 is not provided (the gap is filled with air with refractive index 1), the optical isolator element 1 must be installed with an angle within the shaded area delimited by the two straight lines shown in FIG. 5A in order to restrict the increase in insertion loss within 0.3 dB. In FIG. 5A, angle of the groove is plotted along the horizontal axis and the angle of the optical isolator element is plotted along the vertical axis.

Figure 6:
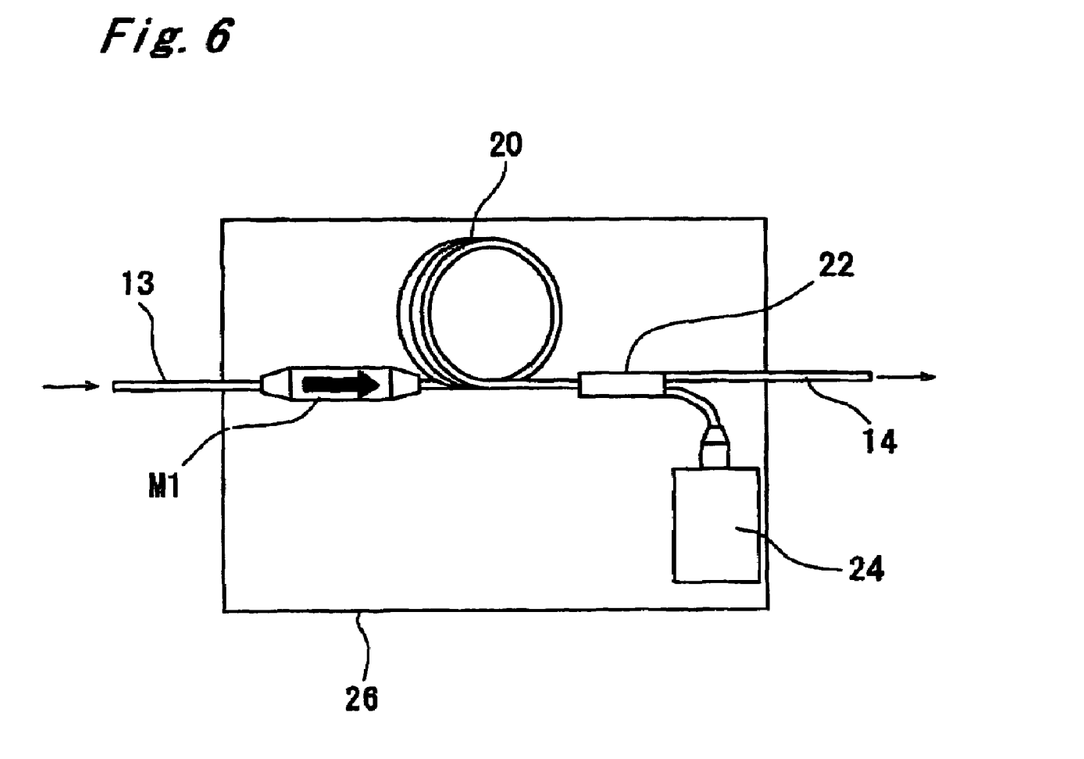
FIG. 6 is a schematic diagram of an optical fiber amplifier incorporated with an optical isolator of an embodiment of the present invention.

FIG. 6 shows a schematic diagram of an optical fiber amplifier incorporated with a optical isolator M1 of an embodiment of the present invention. The optical fiber amplifier 26 comprises an input optical fiber 13, an optical isolator connected with the input optical fiber 13, a rare-earth-doped fiber 20 connected with the optical isolator M1, a light source 24 for exciting the rare-earth-doped fiber, and an output optical fiber 14 that output amplified light from the rare-earth-doped fiber 20. The light source 24 is connected with the rare-earth-doped fiber 20 and the output optical fiber 14 via an optical coupler 22. The rare-earth-doped fiber 20 is doped with one or more rare earth metals such as erbium, neodymium, thulium and the like and is excited to a light-emitting state by the incident light from light source 24. Thus, the incident signal light entered via the optical isolator M1 is amplified in the rare-earth-doped fiber 20. The amplified light goes out through the output fiber 14. The rare-earth-doped fiber has reciprocity and may amplify the undesired backwardly-propagating light. Therefore, it is very effective to use the optical isolator M1 in such optical amplifier 26 to shut off the undesired backward propagation of light.

The optical isolator M1 may be arranged on the output side of the rare-earth-doped fiber, as well as on the input side. However, arranging the optical isolator M1 on the input side is advantageous in terms of better blocking the backwardly propagating light. Also, the light source 24 may be connected to the input side of the rare-earth-doped fiber 20, instead of the output side of the rare-earth-doped fiber 20. Further, the light source 24 may be connected on both sides of the rare-earth-doped fiber 20. Some optical element may be inserted in between the optical isolator M1 and the rare-earth-doped fiber M1, as long as the optical isolator M1 is optically connected with the rare-earth-doped fiber 20. Similarly, some optical element may be inserted in between the light source 24 and the rare-earth-doped fiber 20, if the light source 24 and the rare-earth-doped fiber 20 are optically connected with each other.

As will be apparent from comparison of FIG. 5A and FIG. 5B, it can be seen that a greater tolerance is allowed for setting the tilting angle of the optical isolator element 1 when the light transmitting filler 11 having a is predetermined relative refractive index is used. It can also be seen that, when the light transmitting filler 11 is used, optimum tilting angle of the optical isolator element 1 does not experience significant differences even when the angle of the groove 10 (that is the end face angle of the coreless fiber 8) changes. Thus using the light transmitting filler 11 enables it to keep the insertion loss at a low level even when the tilting angle of the optical isolator element 1 and/or the angle of the groove 10 experience some changes.

EXAMPLE 1

An example of the present invention will now be described with reference to FIG. 1.

The optical fiber assembly 9 was made by fusing and connecting the quartz-based single mode fiber 6A having mode field diameter of 10 μm, 0.8 mm of the graded index fiber 7A having core diameter of 105 μm and difference in the refractive index of 0.55%, 2 mm of the coreless fiber 8 made of pure quartz, 0.8 mm of the graded index fiber 7B having similar parameters as those of the graded index fiber 7A and the single mode fiber 6B successively in this order.

Then with a through hole formed in the support body 14 made of zirconia in advance, the optical fiber assembly 9 was inserted into the through hole and secured therein with an epoxy-based thermosetting adhesive 11.

The entire support body 12 together with the coreless fiber 8 portion of the optical assembly 9 was then cut off by dicing, thereby to form the groove 10 at an angle of 1 degree from the optical axis.

The first birefringent crystal 2, the Faraday rotator 5, the second birefringent crystal 3, the third birefringent crystal 4 and the optical isolator element 1 were bonded in the groove 10 with an acrylic adhesive that is cured by UV and heat combined, and gaps were filled with an epoxy-based UV-curing adhesive having low TG (TG <−50° C.) used as the light transmitting filler 11. Tilting angle of the optical isolator element 1 from the optical axis was set to 4.5 degrees. Refractive index of the light transmitting filler 11 was 1.48, and refractive index of the coreless fiber was 1.45. Relative refractive index of the light transmitting filler 11 to the coreless fiber 8 was 1.03.

The first and third birefringent crystals 2, 4 were made of single crystals of rutile structure having thickness of 500 μm. The Faraday rotator 5 was made of bismuth-substituted garnet having thickness of 470 μm. A half wavelength plate made of quartz crystal was used as the second birefringent crystal 3. While the Faraday rotator 5 functions in a magnetic field applied by a permanent magnet, the magnet is omitted. The optical isolator element 1 was installed at a tilting angle of 4.5 degrees so as to correct the beam shift. In this example, about 5.2 degrees can be tolerated for the angle of the optical isolator element 1, as shown in FIG. 5B.

Figure 3:
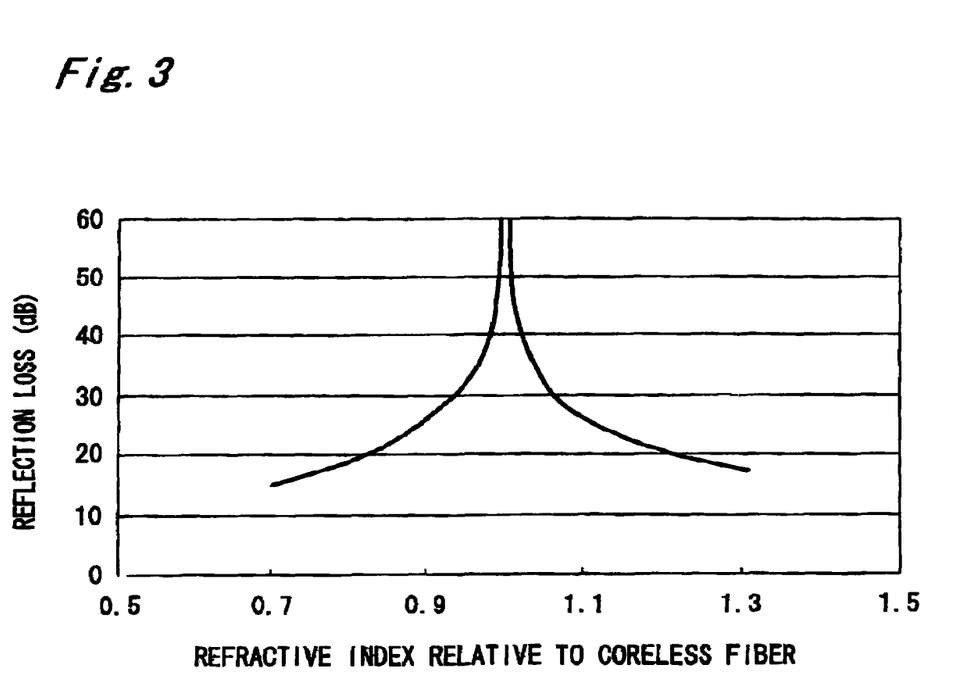
FIG. 3 is a graph showing the relationship between the relative refractive index and reflection attenuation of light transmitting filler.

FIG. 3 is a graph showing the relationship between the relative refractive index of the light transmitting filler 11 and the reflection attenuation with the refractive index of the coreless fiber 8 being normalized to 1. It can be seen that reflection attenuation is 60 dB or more when the relative refractive index is 1.02. Even when the end face angle of the coreless fiber 8, namely the angle of the interface between the coreless fiber 8 and the light transmitting filler 11, is set to zero, reflection attenuation of about 40 dB can be achieved when the relative refractive index is 1.02.

FIG. 4B also shows that, when the refractive index of the light transmitting filler 11 is 1.48 (relative refractive index 1.02) and the end face angle α of the coreless fiber 8 is 1 degree, the emerging light beam undergoes refraction of an angle β of only 0.02 degrees, having almost no influence on setting of the tilting angle of the optical isolator element 1. Therefore, the angle of the optical isolator element can be set with the wide allowance shown in FIG. 5B.

What is claimed is:

1. An optical isolator comprising:
   (a) a support body;
   (b) an optical fiber assembly made of quartz, disposed in said support body including a first single mode fiber, a first graded index fiber that is connected to said first single mode fiber and has refractive index which gradually decreases from the center axis toward the outer surface, a coreless fiber that is connected to said first graded index fiber and does not have a core, a second graded index fiber that is connected to said coreless fiber, and a second single mode fiber connected to said second graded index fiber; and
   c) an optical isolator element disposed in a groove formed in said support body so as to separate said coreless fiber,
   wherein the groove is filled with a light transmitting filler, wherein the refractive index of said light transmitting filler is from 0.94 to 1.06 times as large as that of said coreless fiber,
   wherein said optical isolator element is tilted with respect to the optical axis of said optical fiber assembly, and end faces of coreless fiber to which the optical isolator element is connected are also tilted with respect to the optical axis of said optical fiber assembly, and said optical fiber assembly has such a constitution as the inclination angle X of the groove with respect to the optical axis of said optical fiber assembly and the tilting angle Y of said optical isolator element with respect to the optical axis of said optical fiber assembly are within an area delimited by straight lines represented by equations (1) through (4), with X plotted along x axis and Y plotted along y axis:

$$Y = -0.108X + 5.528 \quad (1)$$

$$Y = 0.093X + 4.633 \quad (2)$$

$$Y = 0.092X + 3.791 \quad (3)$$

$$Y = -0.109X + 4.522. \quad (4)$$

thereby to achieve optical coupling with both the end face of said first graded index fiber on the coreless fiber side and the end face of said second graded index fiber on the coreless fiber side.

2. The optical isolator according to claim 1, wherein said optical isolator element comprises a plurality of birefringent substrates.

3. The optical isolator according to claim 1, wherein the groove is inclined by the same angle as said optical isolator element is tilted, with respect to the optical axis of said optical fiber assembly.

4. An optical fiber amplifier comprising:
   a rare-earth-doped fiber,
   an input optical fiber that input light into said rare-earth-doped fiber,
   an output optical fiber that output amplified light from said rare-earth-doped fiber,
   a light source for exciting said rare-earth-doped fiber, said light source being optically connected with said rare-earth-doped fiber via an optical coupler,
   the optical isolator according to claim 1, said optical isolator being optically connected with said rare-earth-doped fiber on the input optical fiber side or the output optical fiber side of said rare-earth-doped fiber.

* * * * *